Feb. 4, 1958 — J. PESTA — 2,822,100
BOAT TRAILER
Filed Sept. 19, 1956 — 3 Sheets-Sheet 1
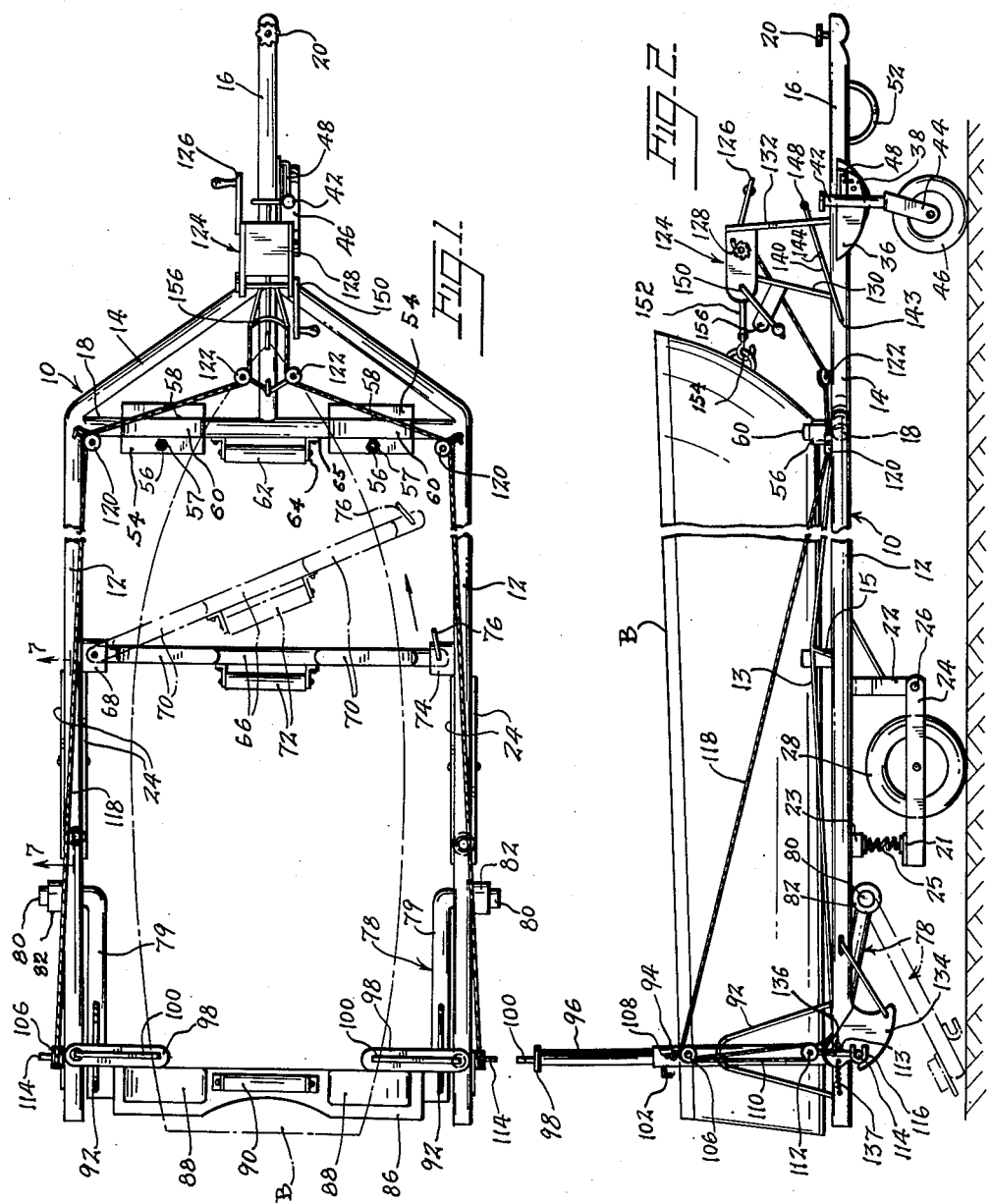
INVENTOR.
JOSEPH PESTA
BY
ATTORNEY Feb. 4, 1958
J. PESTA
2,822,100
BOAT TRAILER
Filed Sept. 19, 1956
3 Sheets-Sheet 2
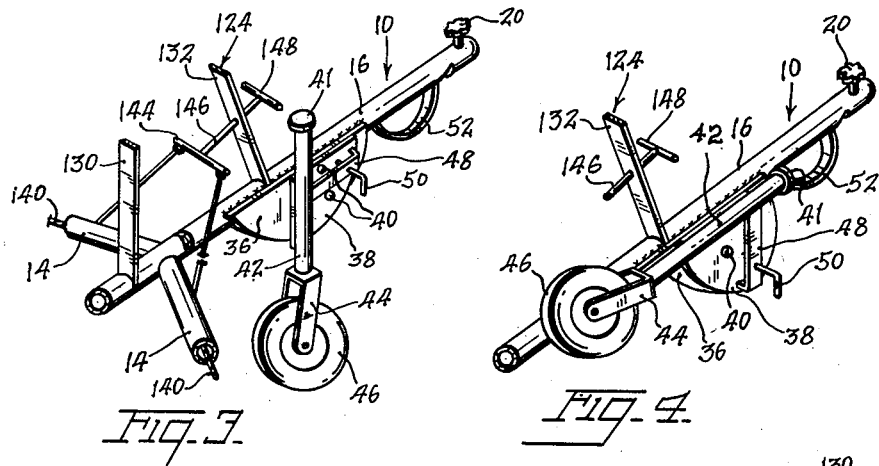
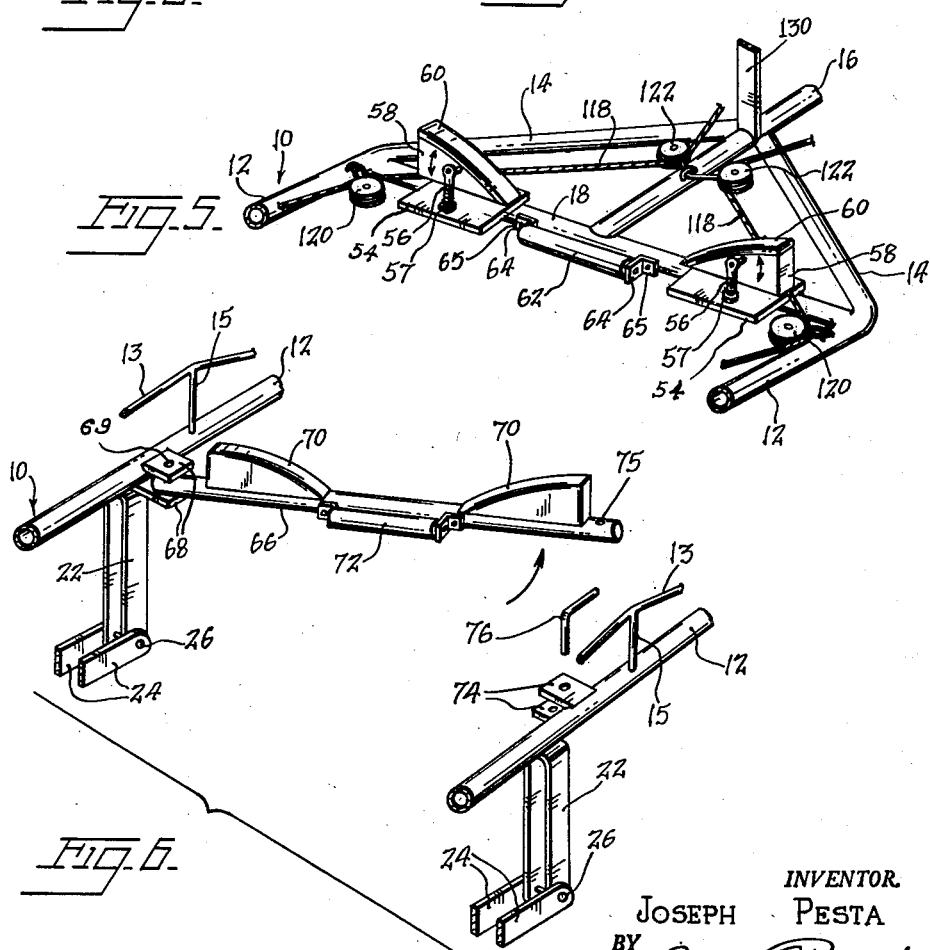
INVENTOR.
JOSEPH PESTA
BY
ATTORNEY Feb. 4, 1958　　　　　J. PESTA　　　　　2,822,100
BOAT TRAILER Filed Sept. 19, 1956　　　　　　　　　3 Sheets-Sheet 3

INVENTOR.
JOSEPH PESTA
BY
ATTORNEY

United States Patent Office 2,822,100
Patented Feb. 4, 1958

2,822,100

BOAT TRAILER

Joseph Pesta, Ocala, Fla.

Application September 19, 1956, Serial No. 610,777

3 Claims. (Cl. 214—396)

This invention relates generally to boat trailers, and more particularly, has reference to a device of this nature designed to particularly facilitate the loading, unloading, and transportation of the boat.

One object of importance is to provide a boat trailer having a rollable frame and a plurality of boat-supporting bars spaced longitudinally of and extending transversely of the frame, so constructed that a rear boat support assembly can be lowered when the frame is backed to the bank of or into a body of water, with an intermediate boat support bar being swingable out of a boat-supporting position, in such a manner as to permit the boat to be floated directly off the frame, with maximum speed and ease.

Another object is to so design the trailer as to permit the entire loading and unloading operation to be carried out by a single person.

A further object is to form the device in such manner as to permit the boat to be loaded or unloaded with ease both in very shallow and in deep water.

A further object is to provide a boat trailer that will be wholly practical, will be capable of being manufactured at low cost, will be relatively light while still possessing considerable strength, and will be rugged and adapted for trouble-free operation.

Yet another object is to provide laterally swingable, paddle-like abutments upon opposite sides of the rear end portion of the trailer, which are adapted to support license plates, stop lights, reflectors, etc., with said supports being further designed to constitute abutments adapted to engage the boat when the boat is loaded, for the purpose of holding the same upon the trailer.

Still another object is to so design the laterally swingable paddles as to permit vertical adjustments thereof, to accommodate the same to boats of different sizes, with the paddle-like abutments further having the highly desirable feature of guiding the boat into position within the trailer when the boat is being floated into the trailer. The abutments referred to, in this connection, are so designed as to control the boat from swinging from side to side, even in rough or swiftly moving waters.

A further object is to so locate said abutments as to support the tail light and license plates in positions in which they will not under any condition become wet and subject to corrosion.

A further object is to form the trailer in a manner to permit one to move the full distance thereabout during loading or unloading, with the boat being kept constantly under control.

Yet another object is to form a boat trailer in such a manner as to permit the same to be used as a support during repair or maintenance work upon the hull of the boat.

A further object is to provide a spring suspension wheel unit at each side of the trailer designed to provide for a cushioned ride, with the rear units being designed to be used under any rugged conditions, and being further designed to facilitate easy turning during high speed traveling.

Still another object is to provide, at the front end of the trailer, a parking wheel assembly swiftly adjustable between operative and inoperative positions, and readily locked in each position to which it is so adjusted. Still another object is to provide, in association with a vertically swingable, U-shaped rear support means for the boat, locking plate means capable of being remotely controlled from the front end of the trailer, said locking plate means being designed to cause the rear boat support means to automatically be latched in an elevated position, when it is swung upwardly under the boat after the boat has been floated into the frame.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a boat trailer according to the present invention, a supported boat being shown in dotted lines, the intermediate support bar being shown in full lines in its operative position and in dotted lines partly adjusted to an inoperative position, portions of the structure being broken away.

Fig. 2 is a side elevational view of the device with the boat shown in full lines, the boat being shown as it approaches its final loaded position.

Fig. 3 is an enlarged, fragmentary perspective view of the front end of the structure showing the parking wheel in operative position.

Fig. 4 is a view similar to Fig. 3 in which the parking wheel has been adjusted to an inoperative position.

Fig. 5 is an enlarged, fragmentary perspective view of the front end portion of the frame illustrating the front boat support bar.

Fig. 6 is an enlarged, fragmentary perspective view of the intermediate portion of the frame illustrating the intermediate boat support bar swung partly from its operative position.

Figure 7:
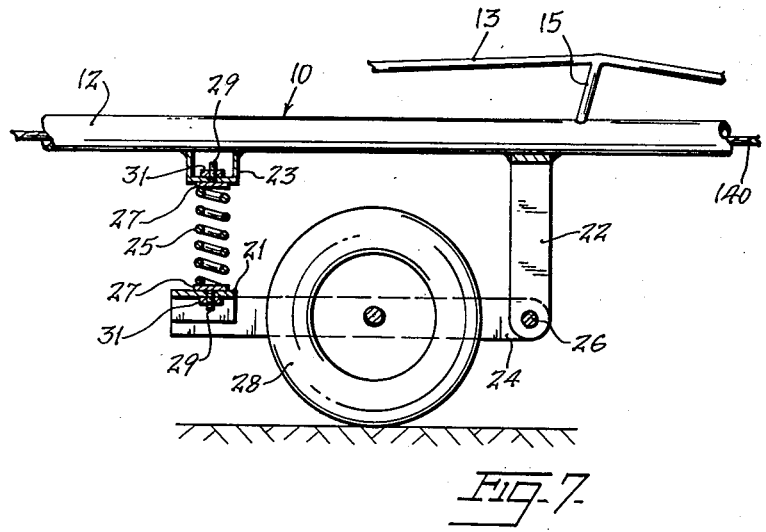
Fig. 7 is an enlarged, fragmentary longitudinal sectional view substantially on line 7—7 of Fig. 1, showing one of the wheel units.

Referring to the drawings in detail, the boat trailer constituting the present invention includes a frame generally designated 10. The frame may appropriately be considered as being approximately Y-shaped, with the bight portion at the head end of the frame, the frame opening rearwardly to receive a boat B to be carried thereby.

The frame includes a pair of elongated, straight side rails 12 of tubular material, integral or otherwise rigid at their front ends with forwardly converging portions 14 welded at their convergent ends to an elongated, tubular tongue 16 of straight formation, extending longitudinally and centrally of the frame and projecting a substantial distance beyond the convergent ends of the portions 14.

Welded to and extending between the rear or divergent ends of the portions 14 is a front boat support bar 18 of tubular material, which is disposed perpendicularly to the length of the tongue 16 and is welded to the rear end of the tongue.

At its front end, tongue 16 is provided with a hitch 20, whereby the entire device can be hitched in the usual manner to a traction vehicle, not shown.

Intermediate its ends, the frame 10 is rollably supported upon wheel units shown to particular advantage in Fig. 7. The wheel units are identical, so the description of one will suffice for both. The wheel units are aligned transversely of the frame, with each including a hanger 22 of inverted U-shape welded at the bight portion thereof to the other side of the adjacent side rail 12. A pair of laterally spaced arms 24 are pivotally connected, by a pin 26, at their front ends to the lower end of the hanger 22, for vertical swinging movement. A wheel 28 is rollably supported upon a stub axle extending between the transversely spaced arms 24 intermediate the opposite ends of said arms.

At their trailing ends, arms 24 have convergent portions, and embraced by and welded to said convergent portions is a lower spring seat 21 of inverted U-shape, vertically spaced from an upper spring seat 23 welded to the side rail 12 and formed to a U-shape. A compression coil spring 25 is extended between the seats 21, 23, and is welded at its opposite ends to abutment plates 27, 27 rigid with studs 29, 29 extended through openings formed in the spring seats and secured to the seats by nuts 31 threaded upon the studs.

It will be seen that by reason of this arrangement, should the wheel 28 strike a stone or move into a depression, the arms 24 can swing upwardly or downwardly as the case may be.

The spring 25, of course, is of such strength as to resist lateral deflection, while still compressing and expanding in an axial direction as necessary. The arrangement provides for individual spring suspension means for the respective wheels, so that each wheel can ride over obstructions or into depressions without transmitting more than a minimum amount of corresponding movement to the respective sides of the frame. A cushioned ride for the boat is thus provided, that permits the boat to be drawn with the trailer at high speeds upon the highway, and further, the construction is so designed as to facilitate turning of the trailer during movement of the traction vehicle around curves.

To brace the frame at its opposite sides, trusses may be provided as shown to particular advantage in Figs. 2 and 7. These trusses have been designated at 13, and comprise elongated truss rods welded at opposite ends to the forward and rear end portions of the respective side rails 12, with the truss rods being connected intermediate their ends fixedly to the side rails by means of connecting braces 15.

A parking wheel assembly is also provided upon the device, and is shown to particular advantage in Figs. 3 and 4.

The parking wheel assembly includes an elongated plate 36 welded to one side of the tongue 16 in a vertical plane. In face-to-face contact with plate 36 is a segmentally shaped pivot plate 38, pivoting upon a bolt or rivet 40 projecting laterally from plate 36 between opposite extreme positions ninety degrees apart shown in Figs. 3 and 4 respectively.

Welded to one edge of pivot plate 38, and disposed in a vertical position when the pivot plate 38 is in the Fig. 3 position thereof, is an elongated sleeve 42. Rotating in the sleeve is a headed shaft 41, the lower end of which is secured to a depending yoke 44 embracing and rotatably supporting a parking wheel 46. A caster-type parking wheel is thus provided, which can be swung downwardly from its Fig. 4 to its Fig. 3 position when the trailer is parked. When the trailer is to be drawn behind a vehicle, the parking wheel assembly is swung to its Fig. 4 position, clockwise about its pivot 40 viewing the same as in Figs. 3 and 4 to elevate the parking wheel 46.

Means is provided for locking the parking wheel assembly in selected positions to which it is swung. To this end, there is provided a lock pin support bar 48 welded or otherwise fixedly secured to the outer surface of the pivot plate 38, and having an opening receiving a lock pin 50. When the pivot plate 38 is in its Fig. 3 position, an opening therein, that is registered with the lock pin opening of the bar 48, is also in registration with a locking opening of the plate 36 so that the lock pin 50 can be extended through the several registering openings to lock the parking wheel by lockably engaging the pivot plate 38 with the stationary plate 36. When the parking wheel assembly is to be swung to its inoperative position, the lock pin is retracted, and when the pivot plate 38 has been swung ninety degrees from its Fig. 3 position, the pin-receiving opening thereof is in registration with a second opening of the plate 36, and lock pin 50 is reinserted so as to now lock the wheel assembly in its retracted or upwardly swung position.

Welded to and depending from tongue 16 immediately in front of the parking wheel assembly is a semicircular drag foot 52 which protects the tongue and parking wheel assembly whenever the tongue is swung downwardly with the parking wheel assembly in its Fig. 4 position.

The front support bar assembly will now be described and has been shown to particular advantage in Fig. 5. Welded to the top surface of the bar 18, adjacent opposite ends thereof, are flat plates 54 disposed in a horizontal plane. Projecting upwardly from plates 54 at opposite sides of bar 18 are threaded rods 56, there being a pair of such rods on each plate 54, one at each side of the bar 18. Rods 56 extend through smooth-walled openings of the plates 54, and nuts 57 are threaded upon the rods, bearing against the upper surfaces of the plates 54. Similar nuts would be provided on the lower extremities of the rods 56, and would be threaded against the undersides of the plate 54. The rods 56 are thus vertically adjustable within their associated plates, to correspondingly adjust in a vertical direction identically but oppositely formed, tapering front cradles 58 having cushioned top surfaces 60. The cradles 58, intermediate their ends, having pins not shown extending transversely therethrough, with said pins being journalled in eyes formed upon the upper ends of the rods 56. The cradles 60 are thus independently pivoted for swinging movement upon the bar 18 about parallel axes extending longitudinally of the frame, thus to permit the cradles to adjust themselves to the cross-sectional contour of the underside of the supported hull. At the same time, the cradles are vertically adjustable by reason of the rod adjustment previously described.

Carried by the bar 18 between the cradles is a front roller 62, having trunnions at its ends journalled in connecting plates 64 adjustably carried by angle brackets 65 fixedly secured to the bar 18. The roller 62, on adjustment toward and away from the bar 18 in a direction transversely of the bar 18, is adjusted in a vertical direction, due to the fact that the connecting members 64 are mounted upon the brackets 65 for adjustment in a direction radially of the bar 18, in a path inclined from the horizontal.

Referring now to the intermediate boat support means, this is shown in Fig. 6, and comprises an intermediate boat support bar 66, swingable between a use position in which it extends perpendicularly to the longitudinal center line of the frame, and an inoperative position in which it extends in substantially longitudinally contacting relation with one of the side rails 12, this being the left-hand side rail viewing the same as in Fig. 6. Bar 66, to this end, is pivotally connected to and between bracket plates 68 welded to and projecting laterally inwardly from the side rail 12 shown at the left in Fig. 6. The bar 66 is in a plane common to that of the side rails, and swings about a vertical axis 69 adjacent the left-hand side rail.

Carried by the bar 66 are cradles 70, having downwardly converging, cushioned top surfaces, and between the cradles there is a roller 72 which is adjustably mounted upon bar 66 in the same manner as the front roller 62. The cradles 70 can be omitted to facilitate lateral swinging of the bar 66, if desired.

The free end of the bar 66 is adapted to be received between laterally, inwardly projecting locking plates 74 carried by the other rail 12, and having vertically aligned openings registering with an opening 75 formed in the free end of bar 66 when the bar is in its use position, a locking pin 76 being adapted for extension through the registering openings to lock the bar 66 in said use position thereof.

At the stern, the boat B is supported by a pivoted yoke generally designated 78. This is shown to best advantage in Figs. 1 and 8. As shown, yoke 78 includes a U-shaped, tubular member having legs or sides 79 extending adjacent and parallel to the respective side rails 12, inwardly from the side rails. At their forward ends, the legs 79 are integral with outwardly projecting extensions 80 journalled in bearing sleeves 82 welded to the undersides of the respective side rails 12.

At their trailing ends, the legs 79 are integral with a bight portion 84, and fixedly mounted upon the bight portion, which extends transversely of the frame, is an elongated support plate 86 on the opposite ends of which cradles 88 are mounted for vertical adjustment between the cradles 88, a roller 90 is mounted upon the plate 86, for vertical adjustment.

It will be seen that the lifting yoke swings vertically, about a horizontal axis perpendicular to the longitudinal center line of the frame. The yoke swings between the full and dotted line positions shown in Fig. 8.

Welded to and projecting upwardly from the respective legs 79 of yoke 78 are guides 92 of inverted U-shape (see Fig. 2), these being adapted to protect both the boat and the trailer, should the boat tend to shift laterally within the trailer during loading, unloading, or transport thereof.

Figure 9:
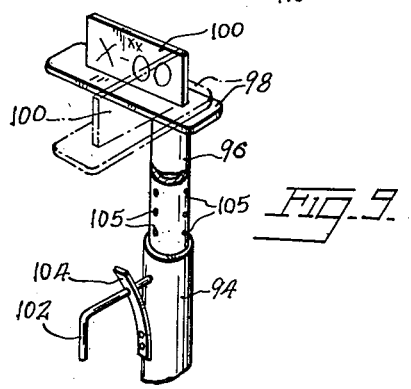
Fig. 9 is an enlarged, fragmentary perspective view of one of the laterally swingable boat stops, shown in full and dotted lines in its operative and inoperative positions respectively.

Welded to and projecting upwardly from the rear end portions of the side rails 12 are standards 94 of tubular formation, defining upwardly opening sleeves in which are telescopically and rotatably adjustable posts 96 to the upper ends of which are welded laterally projecting, horizontally disposed, abutment or stop plates 98. Referring to Fig. 9, the plates 98 normally project laterally, inwardly of the frame as shown in full lines in this figure of the drawing, but by rotation of the posts 96 are swingable to positions in which they extend lengthwise of the frame. Mounted upon and projecting upwardly from the paddle-like abutments or stops 98 are license and identification plates 100, and of course, there would also be mounted upon the abutments stop lights, reflectors, or any other devices required by law or dictated by safe driving practices.

By vertical adjustment of posts 96, the abutments can be located so as to engage in back of the stern or transom of the boat, to hold the same upon the frame. Alternatively, the abutments can engage the sides of the hull to hold the boat against lateral movement at its rear end. Still further, the paddle-like abutments can extend inwardly over the top of the hull to limit the boat against bouncing movement upon the frame. The particular manner in which the abutments would be employed would depend upon the length and size of the boat, its beam, etc.

To maintain the posts 96 in selected positions to which they are vertically and rotatably adjusted, there is provided a lock pin 102 fixedly secured to the upper, free end of a leaf spring 104 anchored at its lower end to each sleeve 94. The spring is tensioned to normally shift the lock pin 102 inwardly through an opening in the sleeve 94, for engagement of the same in a selected one of a plurality of openings 105 formed in the associated posts 96. Openings 105 are not only spaced longitudinally of the post 96, but are also located in angularly spaced relation about the post's circumference so that the post 96 can be both rotatably and vertically adjusted and locked in each position to which it is so adjusted.

The means for lowering and raising the yoke 78 will now be described. Referring to Fig. 2, a sheave 106 is suspended from an eye 108 carried by each sleeve 94 at the upper end thereof. A cable 110 is connected at one end to eye 108, and extends downwardly from said eye, being trained about a sheave 112 carried by an adjustable rod 113 (see Fig. 8) mounted for adjustment in the direction of its length within a laterally projecting extension 114 welded to and extending outwardly from each leg 79. A C-shaped stop 116 is welded to the outer end of each extension or projection 114.

In this way, it will be seen that the sheave 112 can be adjusted toward and away from the associated projection 114, by axial adjustment of rod 113 in a diametrically extending opening of the projection 114. Nuts are threaded upon the rod 113 to hold the same in selected positions to which it is so adjusted.

Alternatively, an eye can be welded directly to the projection 114 or the C-shaped collar 116, pivotally receiving an eye of the sheave 112 in the same manner that the sheave 112 has its eye pivotally connected to an eye formed at the upper end of the rod 113.

After being trained about the sheave 112, the cable 110 is trained about the sheave 106 as shown in Fig. 2, and is then extended forwardly as at 118 to the front end of each rail 12.

Pivotally connected to the front end of each side rail 12 is a sheave or pulley 120 (see Fig. 5), the cables being trained thereabout and then being extended in forwardly converging relation to be trained about transversely spaced pulleys 122 pivotally connected to the tongue 16. The cables are then extended upwardly from pulleys 122, to a double winch assembly 124, having a main winch rotated by a crank 126, said main winch including pawl and ratchet means 128 (Fig. 2). The winch assembly is mounted upon the upper ends of upwardly converging winch support bars 130, 132 welded to and extending upwardly from the tongue 16.

Figure 8:
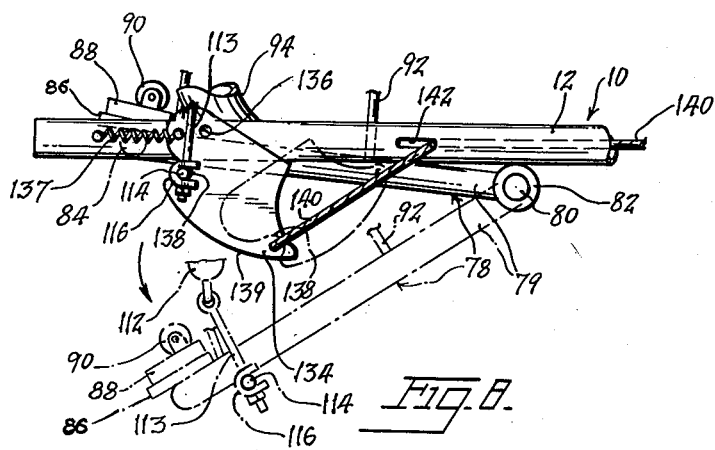
Fig. 8 is a still further enlarged, fragmentary side elevational view of the rear end portion of the trailer showing the rear boat supporting assembly in full lines in its elevated, boat-supporting position and in dotted lines lowered to its boat-releasing position.

It will be seen that by rotating the crank 126, the yoke 78 can be raised from its dotted line position of Figs. 2 and 8, to its boat supporting position shown in full lines in these figures of the drawing. When the yoke is so raised, the ratchet and pawl means prevents retrograde movement thereof. When the yoke is to be lowered, the pawl is disengaged, and the weight of the yoke will cause the same to be dropped down, after it is unlocked and freed from downward swinging movement. With reference to the locking of the yoke, as shown in Fig. 8 there are mounted upon the side rails 12, adjacent the rear ends thereof, locking plates 134 swingable in vertical planes about pivot pins 136 carried by the side rails. The rear edge of each locking plate has a rearwardly opening recess or notch 138 adapted to receive the adjacent projection 114 of the yoke 78. At the lower ends of the plates 134, adjacent the forward edges of the plates, there are connected cables 140 extending through slots 142 of the side rails 12, so as to extend within the side rails and the forwardly convergent extensions 14 of said side rails.

In the extensions 14 there are formed openings 143 (Fig. 2), through which the pull cables 140 are extended, the pull cables then being connected (see Fig. 3) to the opposite ends of a crossbar 144, having an integral shank 146 slidable in an opening of support bar 132 and provided at its front end with the handle 148.

When pull is exerted upon the handle, the cables 140 will be shifted to the right in Fig. 8, causing the locking plate 134 to swing to its dotted line position in this figure of the drawing, so that the notch 138 thereof disengages the projection 114, freeing the yoke 78 for downward swinging movement.

Normally causing the plate 134 to swing to its locking position is a contractile spring 137 (Fig. 8) connected between the locking plate and the rail 12.

Of course, the pivot points of the locking plates, and the location of the spring, can be varied as desired, so long as each locking plate tends to return to its locking position shown in full lines in Fig. 8, and so long, further, as the locking plate will swing to a position, when pull is exerted upon the cable 140, that will disengage the projection 114 to free the yoke for downward swinging movement.

The undersides of the locking plates are formed with inclined cam surfaces 139, and accordingly, when the yoke 78 is swung upwardly, the projections 114 will engage the cam surfaces, and will cammingly bias the locking plates 134 counterclockwise about their pivots, viewing the same as in Fig. 8, to permit the projections to enter the notches 138. The springs 137 then contract, to maintain the locking plates in their yoke-locking positions. The locking of the yoke in its upwardly swung position is thus effected automatically responsive to elevation of the same.

An auxiliary winch is provided in the winch assembly 124, aft of the main winch, and includes a crank handle 150. A cable 152 is wound upon the drum of the auxiliary winch, and has a hook 154 (Fig. 2), adapted to engage in an eye provided at the bow of the boat B. This facilitates pulling of the boat into the trailer, and holds the boat against slippage rearwardly out of a properly supported position when the boat is being transported.

Welded to and projecting rearwardly from the bar 130 are rearwardly convergent plates constituting a snubber 156, adapted to receive the nose or bow of the boat when the boat is in its full, supported position. The boat is shown approaching such a position in Fig. 2.

With the boat engaged in the snubber 156, the abutments 98 are adjusted so as to engage against the stern of the boat, should the boat be of a length that will permit this practice. Alternatively, the abutments can be lowered to engage against the top of the boat to hold the same against bouncing movement at its rear end. Still further, the abutments can be engaged against the sides of the hull, to prevent lateral movements of the boat and also to prevent rearward movements thereof, and said abutments 98 could, to this end, be padded to prevent damage to the hull, if desired.

In use of the trailer, and assuming that the boat is being unloaded in shallow water, it may be noted that the construction is such as to permit the boat to be unloaded in as little as five or six inches of water. The abutments 98 are swung to their dotted line positions of Fig. 9, clear of the boat. Then, the bar 66 is swung out of its boat-supporting position, against the side rail 12 on which it is pivotally mounted. The pivotal connection of the bar 66 to the bracket 68 may, in this regard, be sufficiently loose as to permit not only lateral swinging movement, but also a certain amount of downward swinging movement so that the cradles 70 will clear the underside of the hull when the bar 66 is swung laterally out of a boat supporting position.

Then, the lock plates 134 are pulled to their dotted line positions of Fig. 8, so that the yoke 78 can be lowered by operation of the main winch. The boat is then freed from the hook 154, and is pushed off the front roller 62, to float in the water.

When the boat is being unloaded in deep water, the trailer is backed into the water, the abutments are swung to their dotted line positions of Fig. 9, the boat is unhooked, and is then floated off the trailer.

When loading the boat in shallow water, the boat is floated into the trailer, is hooked to the cable 152, and is then pulled with the auxiliary winch over the front roller 62 into position. The main winch is then used to elevate the yoke 78 to lift the stern end of the boat to a level position. The yoke 78 will automatically lock in its upper position. The abutments are then swung to their locking positions shown in full lines in Fig. 9, the bar 66 is swung to its boat supporting position shown in full lines in Fig. 1 and is locked, and the boat is thus secured for transportation.

When loading the boat in deep water, the boat is run under its own power into the trailer, is hooked to cable 152, and is thus made ready to be pulled with the trailer out of the water. The paddles or abutments 98 are then swung to locking position, and the bar 66 is also swung to its boat-supporting position.

It will be noted that the abutments 98, when in their dotted line positions of Fig. 9, provide guides, that are adapted to guide the boat into the trailer, and are further adapted to control the boat against lateral swinging movement even though the water may be rough or may have a swiftly moving current.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A boat trailer comprising a frame, main wheel means at opposite sides thereof, auxiliary wheel means at the forward end of the frame, front, intermediate, and rear boat support assemblies extending transversely of and spaced longitudinally of the frame, the intermediate and rear assemblies being mounted on the frame for movement into and out of boat-supporting positions, means to lock the rear assembly in boat-supporting positions, means to lock the intermediate assembly in a boat-supporting position, and means on the frame for adjusting the rear assembly into and out of said boat-supporting position thereof, said frame being Y-shaped and opening rearwardly, the Y-shaped formation of the frame defining side rails thereon and a longitudinally and centrally extending, forwardly projecting tongue adapted for connection to a traction vehicle, the rear boat support assembly comprising a U-shaped yoke pivotally connected to the respective side rails for swinging movement about a horizontal axis extending transversely of the side rails, said means for adjusting the rear boat support assembly into and out of its boat-supporting position comprising a winch carried by the frame and cable and pulley means extending along the frame and connected to said yoke.

2. A boat trailer comprising a frame, main wheel means at opposite sides thereof, auxiliary wheel means at the forward end of the frame, front, intermediate, and rear boat support assemblies extending transversely of and spaced longitudinally of the frame, the intermediate and rear assemblies being mounted on the frame for movement into and out of boat-supporting positions, means to lock the rear assembly in boat-supporting positions, means to lock the intermediate assembly in a boat-supporting position, and means on the frame for adjusting the rear assembly into and out of said boat-supporting position thereof, said frame being Y-shaped and opening rearwardly, the Y-shaped formation of the frame defining side rails thereon and a longitudinally and centrally extending, forwardly projecting tongue adapted for connection to a traction vehicle, the rear boat support assembly comprising a U-shaped yoke pivotally connected to the respective side rails for swinging movement about a horizontal axis extending transversely of the side rails, said means for locking the rear boat support assembly in its boat-supporting position comprising lock plates pivotally mounted upon the respective side rails and formed with locking recesses, the yoke having projections engageable in said recesses, pull cables connected to the lock plates and extending to the front end of the frame for swinging the locking plates to projection-disengaging positions, and a handle connected to the pull cables at the front end of the frame for simultaneously pulling upon both of said cables.

3. A boat trailer comprising a frame, main wheel means at opposite sides thereof, auxiliary wheel means at the forward end of the frame, front, intermediate, and rear boat support assemblies extending transversely of and spaced longitudinally of the frame, the intermediate and rear assemblies being mounted on the frame for movement into and out of boat-supporting positions, means to lock the rear assembly in boat-supporting positions, means to lock the intermediate assembly in a boat-supporting position, and means on the frame for adjusting the rear assembly into and out of said boat-supporting position thereof, said frame being Y-shaped and opening rearwardly, the Y-shaped formation of the frame defining side rails thereon and a longitudinally and centrally extending, forwardly projecting tongue adapted for connection to a traction vehicle, the rear boat support assembly comprising a U-shaped yoke pivotally connected to the respective side rails for swinging movement about a horizontal axis extending transversely of the side rails, said means for locking the rear boat support assembly in its boat-supporting position comprising lock plates pivotally mounted upon the respective side rails and formed with locking recesses, the yoke having projections engageable in said recesses, pull cables connected to the lock plates and extending to the front end of the frame for swinging the locking plates to projection-disengaging positions, and a handle connected to the pull cables at the front end of the frame for simultaneously pulling upon both of said cables, the lock plates having their undersides formed with cam surfaces arranged to be engaged by the projections on upward swinging movement of the yoke, for temporarily biasing the lock plates to a releasing position to permit engagement of the projections in the recesses of the lock plates.

References Cited in the file of this patent

UNITED STATES PATENTS

| | | |
|---|---|---|
| 1,219,154 | Rheault | Mar. 13, 1917 |
| 2,214,176 | Portle | Sept. 10, 1940 |
| 2,558,418 | Brueckman | June 26, 1951 |
| 2,676,716 | Sallis | Apr. 27, 1954 |
| 2,708,045 | Shontz | May 10, 1955 |
| 2,711,259 | Jones | June 21, 1955 |
| 2,740,543 | Mounsdon et al. | Apr. 3, 1956 |
| 2,765,942 | Niemeier | Oct. 9, 1956 |

FOREIGN PATENTS

| | | |
|---|---|---|
| 470,114 | Great Britain | Aug. 10, 1937 |